United States Patent Office … 2,769,844 … Patented Nov. 6, 1956

2,769,844

PROCESS FOR PREPARATION OF PARA-ALPHA-CUMYL PHENOL

George G. Joris, Madison, N. J., assignor to Allied Chemical & Dye Corporation, New York, N. Y., a corporation of New York No Drawing. Application June 5, 1952, Serial No. 291,979

1 Claim. (Cl. 260—619)

This invention relates to production of para-alpha, alpha-dimethylbenzyl phenol, more briefly called cumyl phenol hereinafter in this specification.

It has been proposed to produce cumyl phenol from phenol and cumyl chloride or bromide by a process involving first conversion of dimethyl phenyl carbinol to cumyl chloride or bromide by esterification with hydrogen chloride or bromide. After a purification step, the cumyl chloride or bromide is condensed with phenol in presence of a catalyst such as aluminum chloride or bromide at temperatures up to about 40° C. It has also been suggested that cumyl phenol can be prepared by condensing alpha-methylstyrene with phenol in presence of a catalyst such as aluminum chloride, ferric chloride or stannic chloride.

I have now discovered a process for obtaining cumyl phenol in good yields in a direct one-step reaction from phenol and dimethyl phenyl carbinol. In a preferred embodiment of my invention the phenol and dimethyl phenyl carbinol reactants are both in the form of crude cumene oxidation products; and suitably they are obtained simultaneously by air oxidation of cumene. Under preferred conditions in accordance with my process, yields of cumyl phenol based on dimethyl phenyl carbinol introduced into the reaction zone are practically quantitative and yields based on phenol consumed are high.

In my process I employ starting material diluted by no more than about 9-fold its weight of cumene, in order to obtain a favorable reaction medium as will be explained in more detail below. The reaction mixture is maintained under temperatures and pressures at which it is liquid, temperatures being at least about 55° C. Input mol ratios of at least about 2:1 of phenol:dimethyl phenyl carbinol are employed. As catalyst there is dissolved in the reaction mixture at least one material of the group consisting of sulfur dioxide, and compounds containing the sulfonyl radical.

Preferably the reaction in accordance with my process is carried out in a reaction medium serving to dilute the incoming reactants. A preferred reaction medium is the reaction mixture formed during the course of reaction with phenol added in excess over that theoretical required for the reaction:

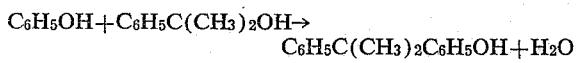

$$C_6H_5OH + C_6H_5C(CH_3)_2OH \rightarrow C_6H_5C(CH_3)_2C_6H_5OH + H_2O$$

Preferably the input phenol amounts to between about 2:1 and about 3:1 mol ratio with input dimethyl phenyl carbinol. Phenol is quite stable under my reaction conditions, so that much higher ratios, such as 10:1, can be used.

Temperatures in my process are in the range between about 120° C. and about 150° C., depending to some extent on other factors such as catalyst concentration as discussed in more detail below. At temperatures in the preferred range rapid reaction and practically quantitative yields of cumyl phenol on the dimethyl phenyl carbinol introduced into the reaction zone with high yields on phenol consumed can be obtained.

Atmospheric pressures are ordinarily used but more elevated pressures can be used, e. g. to retain a volatile catalyst such as sulfur dioxide in the reaction zone. Reduced pressures can also be used, e. g. to permit removal of relatively volatile ingredients of the reaction mixture at reaction temperatures.

The catalyst employed in my process is of a type which dehydrates dimethyl phenyl carbinol, but such dehydrating action is not a sufficient criterion of satisfactory catalysts. In fact, formation of the dimethyl phenyl carbinol dehydration product, alpha-methyl styrene, is an undesired reaction which tends to interfere with reaction forming cumyl phenol in accordance with my invention. The catalyst used in my process also decomposes cumene hydroperoxide largely or completely to phenol and acetone, but such decomposing action is also not a sufficient criterion of suitable catalysts in itself or coupled with the above noted dehydrating action.

The specific catalyst which I have found most effective in my process under appropriate conditions outlined below is sulfuric acid.

Operative quantities of catalyst are as low as 50 parts per million parts by weight of the reaction mixture. Larger amounts are suitable and tend to promote more rapid and complete reaction. As discussed in more detail below, the reaction becomes sensitive to catalyst conditions in certain ranges of temperature and catalyst concentration in which very high yields are obtained; so that at least in these ranges temperatures and catalyst concentrations are interdependent and should be controlled accordingly.

Conditions which promote rapid formation of cumyl phenol are preferred not only in order to utilize the reaction space efficiently, but also because higher yields of cumyl phenol with smaller quantities of by-product tars are obtained thereby. The rate of reaction is influenced by temperature, catalyst concentration, concentration of the reactants in the reaction medium, and also by concentration of cumene which is introduced into the reaction medium when crude cumene oxidation products are employed as starting materials. As cumene is replaced by another solvent such as cumyl phenol, the reaction proceeds more rapidly at lower temperatures.

In accordance with the foregoing, a crude cumene oxidation product introduced into the reaction zone in my process should contain not more than about 90% by weight of unoxidized cumene; and preferably contains not more than about 60% by weight of unoxidized cumene.

Cumene hydroperoxide [$C_6H_5C(CH_3)_2O_2H$] and cumyl peroxide [$C_6H_5C(CH_3)_2O$]$_2$ are oxidation products of cumene which participate in cumyl phenol formation under my reaction conditions. Cumene hydroperoxide functions as a substitute for phenol under my reaction conditions and under these conditions is at least approximately equivalent to a like molar quantity of phenol. Acetone is formed as a co-product from cumene hydroperoxide under my reaction conditions. Cumyl peroxide decomposes under the conditions of my process to form cumyl phenol and acetone.

Accordingly cumene hydroperoxide and/or cumyl peroxide and/or dimethyl phenyl carbinol can be introduced as such or together with other cumene oxidation products and/or unoxidized cumene into the reaction zone in accordance with my process. Cumene oxidation products such as acetophenone, benzaldehyde, benzoic acid, etc. do not participate in cumyl phenol formation, so that preferably cumene oxidation products employed in my process are predominantly dimethyl phenyl carbinol and/or cumene hydroperoxide and/or cumyl peroxide accompanied by more or less unoxidized cumene, but not more than about 90% by weight of unoxidized cumene.

Starting materials especially suited for use in my process can be obtained by oxidizing cumene with elemental oxygen, e. g. air, in presence of controlled amounts of particular heavy metal catalysts and at controlled temperatures. Thus crude cumene oxidation products containing mostly cumene hydroperoxide and/or dimethyl phenyl carbinol, with the balance mainly cumyl peroxide and unoxidized cumene, can be obtained in presence of suspended solid catalysts such as barium oxide, manganese dioxide, chromium trioxide, cobalt oxide and carbonate, and lead oxides. Higher temperatures, larger quantities of the cited catalysts, and longer periods of oxidation generally favor formation of dimethyl phenyl carbinol vs. cumene hydroperoxide.

Specifically, crude cumene oxidation products containing mostly cumene hydroperoxide and dimethyl phenyl carbinol in about 1:1 mol ratios, together with unoxidized cumene, can be obtained by bubbling air through cumene containing suspended therein about 2-3% by weight of manganese dioxide or about 0.3-0.4% by weight of lead dioxide, while maintaining temperatures of about 50° C. for about 70 hours, leaving about 40-45 weight percent of unoxidized cumene. Alternatively, lead dioxide can be added to a mixture of cumene and cumene hydroperoxide maintained at temperatures such as about 100° C. whereby dimethyl phenyl carbinol is formed. Production of dimethyl phenyl carbinol in admixture or not with cumene hydroperoxide by use of lead dioxide catalyst is disclosed and claimed in the copending application of Joris and Griffin, Serial No. 233,245, filed June 23, 1951.

Cumyl phenol yields and content of impurities such as alpha-methylstyrene dimer obtained by my process are influenced by the proportion of phenol present in the reaction mixture. The phenol should be introduced into the reaction zone in at least about 2:1 mol ratio with the dimethyl phenyl carbinol introduced therein to promote high yields and high purity in the final product. Suitably input mol ratios of phenol:dimethyl phenyl carbinol are in the range between about 2:1 and about 10:1. When input phenol is referred to herein it is to be understood that input cumene hydroperoxide is to be treated as equivalent mol for mol to input phenol.

Cumyl phenol product can be recovered from the reaction mixture by extracting this product from the reaction mixture with aqueous alkali and neutralizing the resulting aqueous solution whereupon cumyl phenol precipitates; or can be recovered by vacuum fractional distillation; or by a combination of the two methods. If a fractional distillation is to be employed and highly pure cumyl phenol is desired as product, it is desirable to operate under conditions minimizing formation of alpha-methylstyrene dimer by-product since this compound boils at about the same temperature as cumyl phenol. Suitable conditions for preparing a pure cumyl phenol are afforded by my invention as specifically illustrated below in the examples.

Preferably no substantial quantities of water are present in the reaction mixture other than water formed during the reaction, since substantial amounts of extraneous water tend to reduce the rate and yield of the desired reaction as compared to competing reactions of tar formation, etc.

Suitably any acetone which forms during the reaction is distilled out of the reaction mixture and higher boiling ingredients of the reaction mixture such as hydrocarbons or their azeotropes with water are maintained under reflux in the reaction zone.

The following examples are illustrative of my invention, but it is to be understood that the invention is not limited to every detail thereof. Parts and proportions referred to below are on a weight basis.

The reactions of the examples were carried out in a reaction vessel fitted with a packed column maintained at about 80° C. at the base, to produce reflux of hydrocarbon-water azeotropes; acetone was withdrawn from the top of this column. Reactants were gradually fed into the vessel with stirring; at the end of the reaction period, measured from the time when addition of reactants was completed, the contents of the vessel was cooled, and analyzed after neutralization of the acid catalyst by fractional distillation and infra red absorption methods.

*Examples.*—The starting material providing the reactants was 200 parts of a crude cumene oxidation product obtained by air oxidation in presence of 0.35 weight percent of lead dioxide catalyst at 50° C. and purified by filtration, containing by weight 27% cumene hydroperoxide, 21% dimethyl phenyl carbinol, 7% cumyl peroxide, 2% acetophenone, 42% unoxidized cumene, and 1% of unidentified materials probably including small traces of dissolved lead compounds. The combined input phenol and cumene hydroperoxide: input dimethyl phenyl carbinol mol ratio after all reactants had been added was 2.3:1 and the input cumene hydroperoxide: input dimethyl phenyl carbinol mol ratio was 1.15:1. The crude cumene oxidation product was gradually introduced into a reaction vessel initially charged with 33.3 parts of phenol.

Cumyl phenol (para-alpha, alpha-dimethyl-benzyl phenol) was recovered from the products by fractionation at about 5-10 mm., in substantially pure form when the products contained no alpha-methylstyrene dimer. It is a white solid, insoluble in water, melting at 73°-75° C.

A series of tests was carried out at 140° C. in presence of varying concentrations of 96% sulfuric acid catalyst. Indications from tests of lead dioxide solubility were that about 0.06% of sulfuric acid was neutralized by lead dioxide dissolved in the incoming starting material, so that amounts of sulfuric acid dissolved in the reaction mixture were correspondingly less than the amounts of sulfuric acid added to the reaction mixture in these tests.

The addition of cumene oxidation product was carried out in about 80 minutes and reaction was terminated by cooling, 15 minutes after final addition of oxidation product, and neutralization of the acid.

The following table shows percent of theoretical yield of cumyl phenol obtained based on dimethyl phenyl carbinol and on phenol introduced into the reaction mixture, where cumyl peroxide is included as equivalent on a molar basis to one mol of phenol and to one mol of carbinol and cumene hydroperoxide is treated as equivalent on a molar basis to one mol of phenol.

TABLE

*Cumyl phenol synthesis: effect of sulfuric acid*

[All runs at 140° C., 2.3 to 1 ratio total phenol to carbinol]

| Percent $H_2SO_4$ | Percent Yield Phenol | Based on Carbinol | Remarks |
| --- | --- | --- | --- |
| 0.16 | ------ | ------ | Carbinol, CHP[1], dimer[2] remaining. |
| 0.24 | 82.9 | 94.7 | Product contained 0.7% dimer. |
| 0.32 | 95.1 | 95.1 | Do. |
| 0.40 | 84.6 | 92.4 | Product contained 0.6% dimer. |
| 0.48 | 82.9 | 97.5 | Product contained 0.2% dimer. |
| 0.50 | 84.9 | 98.7 | Product free of dimer. |
| 0.75 | 98 | 102 | Do. |
| 0.96 | 80.2 | 98.6 | Do. |
| 1.40 | 80.0 | 95.6 | Do. |
| 2.00 | 43.1 | 10.4 | Product contained 2% α-methylstyrene. |
| 0.96 | 72.9 | 87.2 | 3% $H_2O$ present initially. |

[1] CHP = Cumene hydroperoxide.
[2] Dimer = α-methylstyrene dimer.

The balance of the reaction products was chiefly a heavy tar.

The above examples illustrate batchwise reaction to obtain cumyl phenol, but the reaction is suitable for continuous operation since the reaction mixture itself is a suitable reaction medium. Thus one or more of the reactants can be fed gradually, i. e. continuously or periodically, into a reaction mixture obtained in accordance with my process, and products can be withdrawn suitably at a rate approximately balancing the rate of feed whereby continuous or semi-continuous operation is obtained.

The examples above illustrate conditions under which alpha-methylstyrene dimer is substantially eliminated from the reaction products and high yields of cumyl phenol are obtained in relatively short reaction times. It will be observed that under the conditions of the examples the quantity of sulfuric acid employed must be controlled within a rather narrow range of concentrations to obtain high cumyl phenol yields; if the sulfuric acid concentration is too high, formation of tar is promoted as against cumyl phenol formation. Thus when sulfuric acid is present as catalyst and temperatures are in the range between about 120° C. and 150° C., high yield and fast reaction can be obtained under conditions which additionally comprise introducing phenol and/or cumene hydroperoxide into the reaction zone in input mol ratios between about 2:1 and about 3:1 with dimethyl phenyl carbinol introduced therein, and employing sulfuric acid dissolved in the reaction mixture in concentrations above about 0.01% and below about 2% by weight.

I claim:

Process for production of para-alpha-alpha-dimethyl benzyl phenol which comprises forming a liquid reaction mixture by introducing gradually, into a phenol-containing reaction zone, dimethyl phenyl carbinol and cumene hydroperoxide, said starting materials being diluted by not more than about 9-fold their weight of cumene, with cumene hydroperoxide therein being in about 1:1 mol ratio with dimethyl phenyl carbinol therein; maintaining in said reaction mixture mol ratios of input cumene hydroperoxide together with phenol present in the reaction zone:input dimethyl phenyl carbinol in the range between about 2:1 and about 3:1, employing as catalyst sulfuric acid dissolved in the reaction mixtures in amounts above about 0.01% and below about 2% by weight; maintaining temperatures in the range between about 120° C. and about 150° C.; and recovering para-alpha, alpha-dimethyl benzyl phenol.

References Cited in the file of this patent

UNITED STATES PATENTS

| | | |
|---|---|---|
| 1,880,566 | Weiler et al. | Oct. 4, 1932 |
| 2,028,043 | Britton et al. | Jan. 14, 1936 |
| 2,302,466 | Palmer et al. | Nov. 17, 1942 |
| 2,470,902 | Rosenwald | May 24, 1949 |
| 2,644,014 | Saunders | June 30, 1953 |
| 2,668,180 | Boardman | Feb. 2, 1954 |

FOREIGN PATENTS

Kharasch et al.: Jour. Organic Chemistry, vol. 15, p. 749 (July 1950).